(12) United States Patent
Chen et al.

(10) Patent No.: US 9,405,480 B2
(45) Date of Patent: Aug. 2, 2016

(54) INTERLEAVING CODEWORDS OVER MULTIPLE FLASH PLANES

(71) Applicant: Seagate Technology LLC, Cupertino, CA (US)

(72) Inventors: Ning Chen, San Jose, CA (US); Yu Cai, San Jose, CA (US); Yunxiang Wu, Cupertino, CA (US)

(73) Assignee: Seagate Technology LLC, Cupertino, CA (US)

( * ) Notice: Subject to any disclaimer, the term of this patent is extended or adjusted under 35 U.S.C. 154(b) by 268 days.

(21) Appl. No.: 14/156,693

(22) Filed: Jan. 16, 2014

(65) Prior Publication Data

US 2015/0199140 A1    Jul. 16, 2015

Related U.S. Application Data

(60) Provisional application No. 61/926,516, filed on Jan. 13, 2014.

(51) Int. Cl.
*G06F 12/00* (2006.01)
*G06F 3/06* (2006.01)

(52) U.S. Cl.
CPC ............ *G06F 3/0619* (2013.01); *G06F 3/0655* (2013.01); *G06F 3/0659* (2013.01); *G06F 3/0688* (2013.01)

(58) Field of Classification Search
CPC ... G06F 3/0619; G06F 3/0655; G06F 3/0688; G06F 11/1004; G06F 11/1044; G06F 11/1072
See application file for complete search history.

(56) References Cited

U.S. PATENT DOCUMENTS

| | | | | |
|---|---|---|---|---|
| 8,484,408 | B2 | 7/2013 | Hetzler et al. | 711/103 |
| 8,484,534 | B2 | 7/2013 | Olbrich et al. | 714/763 |
| 8,543,742 | B2 | 9/2013 | Yu et al. | 710/22 |
| 2008/0034154 | A1* | 2/2008 | Lee | G06F 12/0246 711/103 |
| 2010/0211833 | A1 | 8/2010 | Weingarten | 714/704 |
| 2011/0075478 | A1* | 3/2011 | Yoon | G06F 11/1072 365/185.03 |
| 2011/0119562 | A1 | 5/2011 | Steiner et al. | 714/766 |
| 2011/0125953 | A1* | 5/2011 | Sartore | G06F 12/0246 711/103 |
| 2012/0144093 | A1 | 6/2012 | Steiner et al. | 711/103 |
| 2012/0311406 | A1 | 12/2012 | Ratnam et al. | 714/768 |
| 2013/0019057 | A1 | 1/2013 | Stephens | 711/103 |
| 2013/0019062 | A1 | 1/2013 | Bennett et al. | 711/114 |
| 2013/0042053 | A1 | 2/2013 | Huang | 711/103 |
| 2013/0262920 | A1 | 10/2013 | Jung et al. | 714/6.22 |
| 2014/0006898 | A1 | 1/2014 | Sharon et al. | 714/755 |
| 2014/0143636 | A1* | 5/2014 | Frost | G06F 11/1044 714/768 |
| 2014/0237287 | A1* | 8/2014 | Burd | G06F 11/1028 714/6.24 |

* cited by examiner

*Primary Examiner* — John Lane
(74) *Attorney, Agent, or Firm* — Christopher P. Maiorana, PC

(57) ABSTRACT

An apparatus having an interface to a plurality of memories and a circuit is disclosed. Each memory generally has a plurality of planes and is nonvolatile. The circuit is configured to (i) generate a plurality of codewords by encoding a plurality of data units, (ii) generate a plurality of slices by parsing the codewords, (iii) generate a plurality of pages by interleaving the slices and (iv) write the pages in parallel into respective ones of the planes.

20 Claims, 6 Drawing Sheets

INTERLEAVING CODEWORDS OVER MULTIPLE FLASH PLANES

This application relates to U.S. Provisional Application No. 61/926,516, filed Jan. 13, 2014, which is hereby incorporated by reference in its entirety.

FIELD OF THE INVENTION

The invention relates to solid-state drives generally and, more particularly, to a method and/or apparatus for interleaving codewords over multiple flash planes.

BACKGROUND

As flash memory geometries scale down, an amount of electrons stored in each flash memory cell decreases. The smaller number of electrons is more susceptible to process variations and so reliability differences among the various flash planes and die become more pronounced. In conventional designs, each codeword is stored on the same die. Therefore, if the error correction coding cannot recover the errors of certain codewords on the worst flash die/plane, an uncorrectable code correction failure happens.

SUMMARY

The invention concerns an apparatus having an interface to a plurality of memories and a circuit. Each memory generally has a plurality of planes and is nonvolatile. The circuit is configured to (i) generate a plurality of codewords by encoding a plurality of data units, (ii) generate a plurality of slices by parsing the codewords, (iii) generate a plurality of pages by interleaving the slices and (iv) write the pages in parallel into respective ones of the planes.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include interleaving codewords over multiple flash planes that may (i) distribute the codewords across multiple flash devices, (ii) improve reliability compared to existing techniques, (iii) average error rates over multiple flash devices, (iv) decrease process variation induced errors inside the codewords and/or (v) be implemented as one or more integrated circuits.

In various embodiments, the codewords are sliced and distributed across multiple flash devices (or die) and/or multiple planes within the flash devices. An error number inside a single codeword is thus an average error rate over multiple die multiplied by the codeword size. Therefore, a worst-case number of raw errors inside the codewords are reduced. The slicing and distributing result in improved reliability compared with common techniques. A premature failure caused by an unreliable flash plane is delayed or potentially eliminated. As such, a program/erase cycle lifetime and a maximum retention time of the flash devices are increased. The slicing and distributing also results in a more predictable performance. Because the errors inside the codewords are averaged, the variations of the errors inside each logical codeword are decreased. Thus, the performance of decoding variations is decreased making the performance more predictable.

Figure 1:
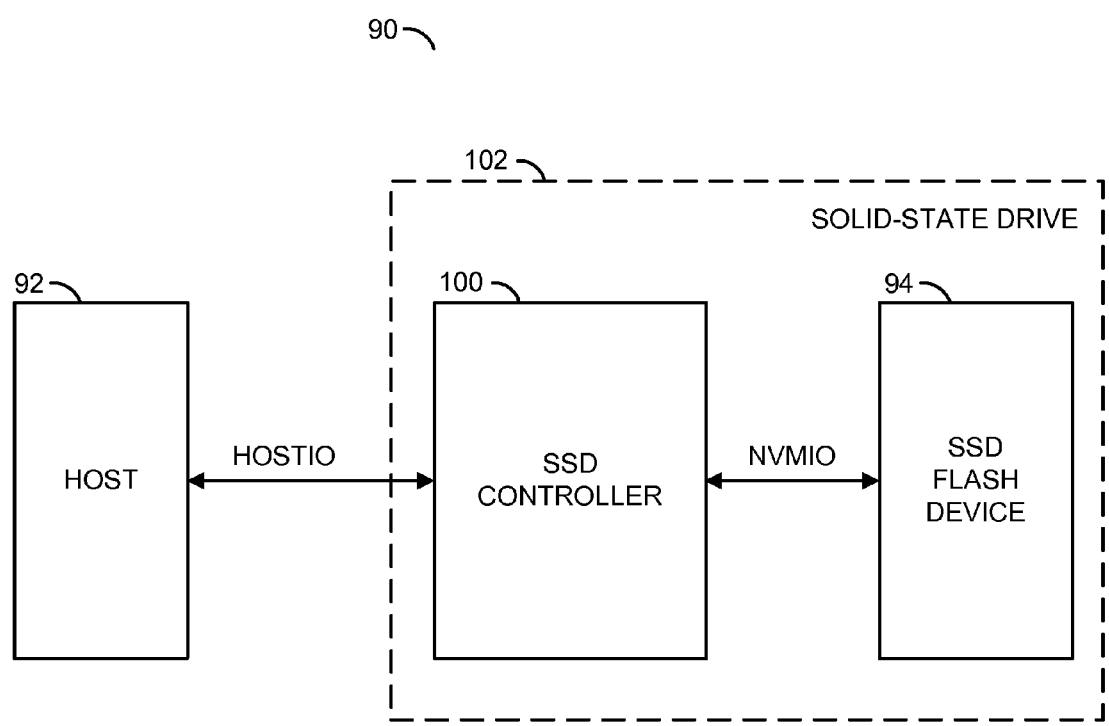
FIG. 1 is a block diagram of an apparatus.

Referring to FIG. 1, a block diagram of an example implementation of an apparatus 90 is shown. The apparatus (or circuit or device or integrated circuit) 90 implements a computer having a nonvolatile memory circuit. The apparatus 90 generally comprises a block (or circuit) 92, a block (or circuit) 94 and a block (or circuit) 100. The circuits 94 and 100 form a drive (or device) 102. The circuits 92 to 102 may represent modules and/or blocks that may be implemented as hardware, software, a combination of hardware and software, or other implementations.

One or more signals (e.g., HOSTIO) are exchanged between an interface of the circuit 92 and an interface of the circuit 100. The host input/output signal HOSTIO generally includes, but is not limited to, a logical address component used to access data in the circuit 102, a host command component that controls the circuit 102, a write data component that transfers write data units from the circuit 92 to the circuit 100 and a read data component that transfers error corrected read data units from the circuit 100 to the circuit 92. One or more signals (e.g., NVMIO) are exchanged between an interface of the circuit 100 and another interface of the circuit 94. The nonvolatile memory input/output signal NVMIO generally includes, but is not limited to, a physical address component used to access data in the circuit 94, a memory command component that controls the circuit 94 (e.g., read or write commands), a write codeword component that carries error correction coded and cyclical redundancy check protected write codewords written from the circuit 100 into the circuit 94 and a read codeword component that carries the error correction coded codewords read from the circuit 94 to the circuit 100.

The circuit 92 is shown implementing a host circuit. The circuit 92 is generally operational to read and write data to and from the circuit 94 via the circuit 100. When reading or writing, the circuit 92 transfers a logical address value in the signal HOSTIO to identify which set of data is to be written or to be read from the circuit 94. The address generally spans a logical address range of the circuit 102. The logical address can address individual data units, such as SATA (e.g., serial-ATA) sectors.

The circuit 94 is shown implementing one or more nonvolatile memory circuits (or devices). According to various embodiments, the circuit 94 comprises one or more nonvolatile semiconductor devices. The circuit 94 is generally operational to store data in a nonvolatile condition. When data is read from the circuit 94, the circuit 94 accesses a set of data (e.g., multiple bits) identified by the address (e.g., a physical address) in the signal NVMIO. The address generally spans a physical address range of the circuit 94.

In some embodiments, the circuit 94 is implemented as one or more flash memories. The circuit 94 may be implemented as a single-level cell (e.g., SLC) type circuit. A single-level cell type circuit generally stores a single bit per memory cell (e.g., a logical 0 or 1). In other embodiments, the circuit 94 may be implemented as a multi-level cell type circuit. A multi-level cell type circuit is capable of storing multiple (e.g., two) bits per memory cell (e.g., logical 00, 01, 10 or 11). In still other embodiments, the circuit 94 may implement a triple-level cell type circuit. A triple-level cell circuit stores multiple (e.g., three) bits per memory cell (e.g., a logical 000, 001, 010, 011, 100, 101, 110 or 111). A four-level cell type circuit may also be implemented.

Data within the circuit 94 is generally organized in a hierarchy of units. A block is a smallest quantum of erasing. A page is a smallest quantum of writing. A codeword (or read unit or Epage or ECC-page) is a smallest quantum of reading and error correction. Each block includes an integer number of pages. Each page includes an integral number of codewords.

The circuit 100 is shown implementing a controller circuit. The circuit 100 is generally operational to control reading to and writing from the circuit 94. The circuit 100 generates write codewords by encoding data units received from the circuit 92. The circuit 100 includes an ability to decode the read codewords received from the circuit 94. The resulting decoded data is presented to the circuit 92 via the signal HOSTIO and/or re-encoded and written back into the circuit 94 via the signal NVMIO. The circuit 100 comprises one or more integrated circuits (or chips or die) implementing the controller of one or more solid-state drives, embedded storage, or other suitable control applications.

As part of the writing, the circuit 100 is generally configured to generate multiple codewords by encoding respective data units. Several codewords are assembled together to form multiple batches, each batch containing two or more codewords. A size of each batch substantially matches a size of a plane in the circuit 94. The circuit 100 also generates multiple slices by parsing the batches/codewords. The slices are interleaved and gathered together into several pages. The circuit 100 uses multiple pages to create a redundancy block that is written into the circuit 94.

As part of the reading, the circuit 100 is generally configured to regenerate the pages by reading the redundancy block from the circuit 94. The pages are parsed to regenerate the slices. The circuit 100 subsequently regenerates the codewords from the slices. The codewords are decoded to regenerate the original data units.

The circuit 102 is shown implementing a solid-state drive. The circuit 102 is generally operational to store data generated by the circuit 92 and return the data to the circuit 92. According to various embodiments, the circuit 102 comprises one or more: nonvolatile semiconductor devices, such as NAND Flash devices, phase change memory (e.g., PCM) devices, or resistive RAM (e.g., ReRAM) devices; portions of a solid-state drive having one or more nonvolatile devices; and any other volatile or nonvolatile storage media. The circuit 102 is generally operational to store data in a nonvolatile condition.

Figure 2:
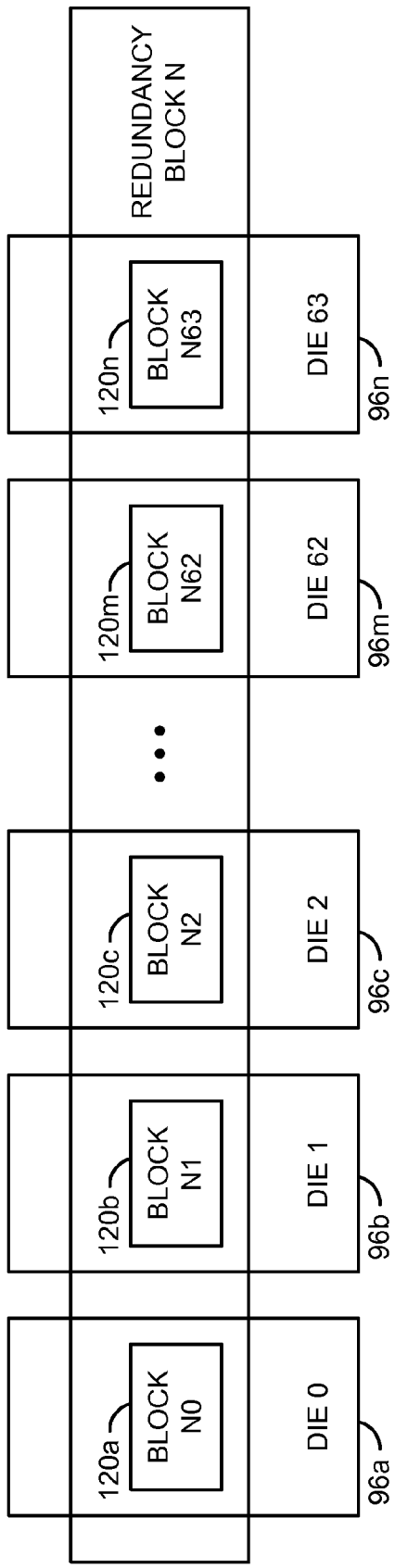
FIG. 2 is a block diagram of a redundancy block.

Referring to FIG. 2, a block diagram of an example redundancy block N is shown. The redundancy block N generally comprises multiple blocks 120a-120n (e.g., N0-N63). Each block 120a-120n has multiple pages. Each block 120a-120n is stored on a different one of several die 96a-96n (e.g., Die 0-Die 63) of the circuit 94. For example, 8 kilobits of data cover 8 die 96a-96n at 1 kilobit per page. In some situations, the redundancy block N has fewer blocks 120a-120n than the number of die 96a-96n. In other situations, the redundancy block N has a larger number of blocks 120a-120n than the number of die 96a-96n.

At a start of the life of the redundancy block N, all of the blocks 120a-120n are read using a single set of average channel parameters. Over time and as the redundancy block N is programmed and erased, one or more blocks (e.g., blocks 120c and 120m) may be identified as outlier blocks having a higher error rate. Therefore, the error correction coding of the outlier blocks is increased to account for the increased error rate.

By applying the redundancy block as a coarse granularity, circuit 100 optionally provides a fault tolerant capability that allows for the loss of one or more blocks 120a-120n (or the corresponding die 96a-96n). In various embodiments, the circuit 100 is operational to generate redundant information (e.g., parity information) from the data being stored in the redundancy block N. The redundant information generally allows reconstruction of the data in the event that one or more of the blocks 120a-120n fails and/or loses power. The data reconstruction is similar to the reconstruction in a redundant array of independent disk (e.g., RAID) hard disk drive. The redundant information is stored in one or more of the blocks 120a-120n of the redundancy block N. The fault tolerance of the redundant information is adjustable. For example, a single redundant block (e.g., 120a) is used to store redundant information sufficient to recover from the loss of a single block 120b-120n. Two redundant blocks (e.g., 120a-120b) are used to recover from the loss of two blocks 120c-120n. Where the redundant information is a mirror copy of the data (e.g., RAID 0), half the blocks 120a-120n may store the data and the other half stores the mirrored copy of the data.

Figure 3:
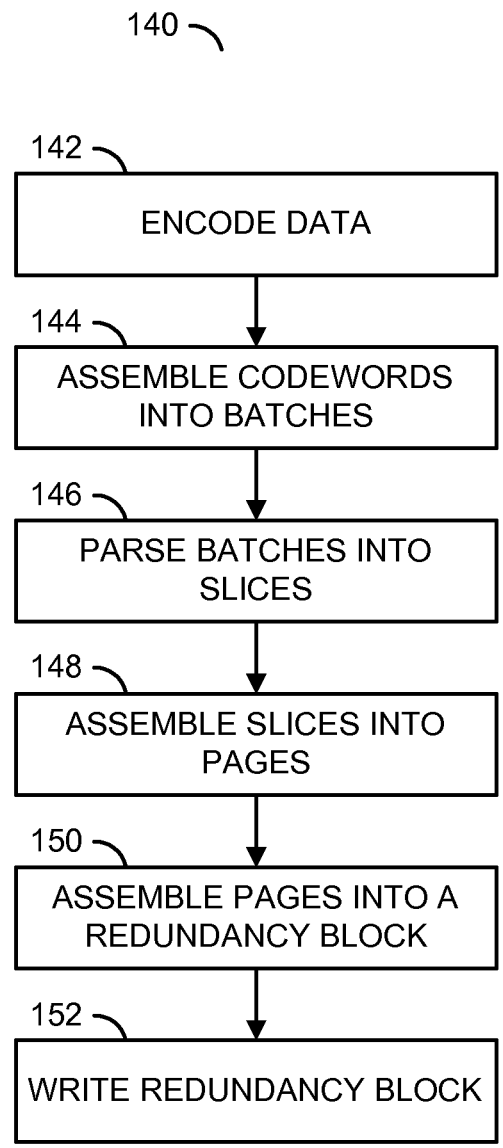
FIG. 3 is a flow diagram of a method for writing in accordance with an embodiment of the invention.

Referring to FIG. 3, a flow diagram of an example method 140 for writing is shown in accordance with an embodiment of the invention. The method (or process) 140 is implemented by the circuit 100. The method 140 generally comprises a step (or state) 142, a step (or state) 144, a step (or state) 146, a step (or state) 148, a step (or state) 150, and a step (or state) 152. The steps 142 to 152 may represent modules and/or blocks that may be implemented as hardware, software, a combination of hardware and software, or other implementations. The sequence of the steps 142 to 152 is shown as a representative example. Other step orders may be implemented to meet the criteria of a particular application.

In the step 142, the circuit 100 encodes data units received in a signal (e.g., DATA) from the circuit 92 (via the signal HOSTIO), read from internal to the circuit 100 and/or read from the circuit 94 as part of maintenance operations. The codewords are assembled into batches by the circuit 100 in the step 144. Each batch has a bit-width that is as large as (substantially matches) or is smaller than the bit-width of a plane in the devices 96a-96n. In the step 146, the batches and/or the codewords within the batches are divided into slices by the circuit 100.

Figure 4:
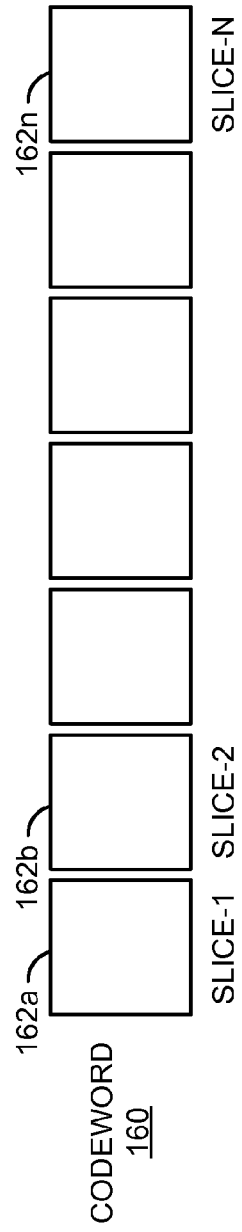
FIG. 4 is a diagram of a codeword divided into slices.

Referring to FIG. 4, a diagram of an example codeword 160 is shown. The data of each codeword 160 is parsed (or divided) into slices 162a-162n with similar sizes. Each slice 162a-162n is eventually stored in a different flash plane. As a result, the error rate inside the codeword 160 is the average number over all flash planes. The number of errors inside the codeword 160 is smaller than the number of errors if the codeword 160 is stored in the worst plane, instead of distributing the codeword 160 over multiple planes. A size of the codeword 160 varies depending on the level of error correction coding (or code rate) performed on the corresponding data unit. Higher error correctable coding generally results in larger codewords 160 than lower error correctable coding.

Figure 5:
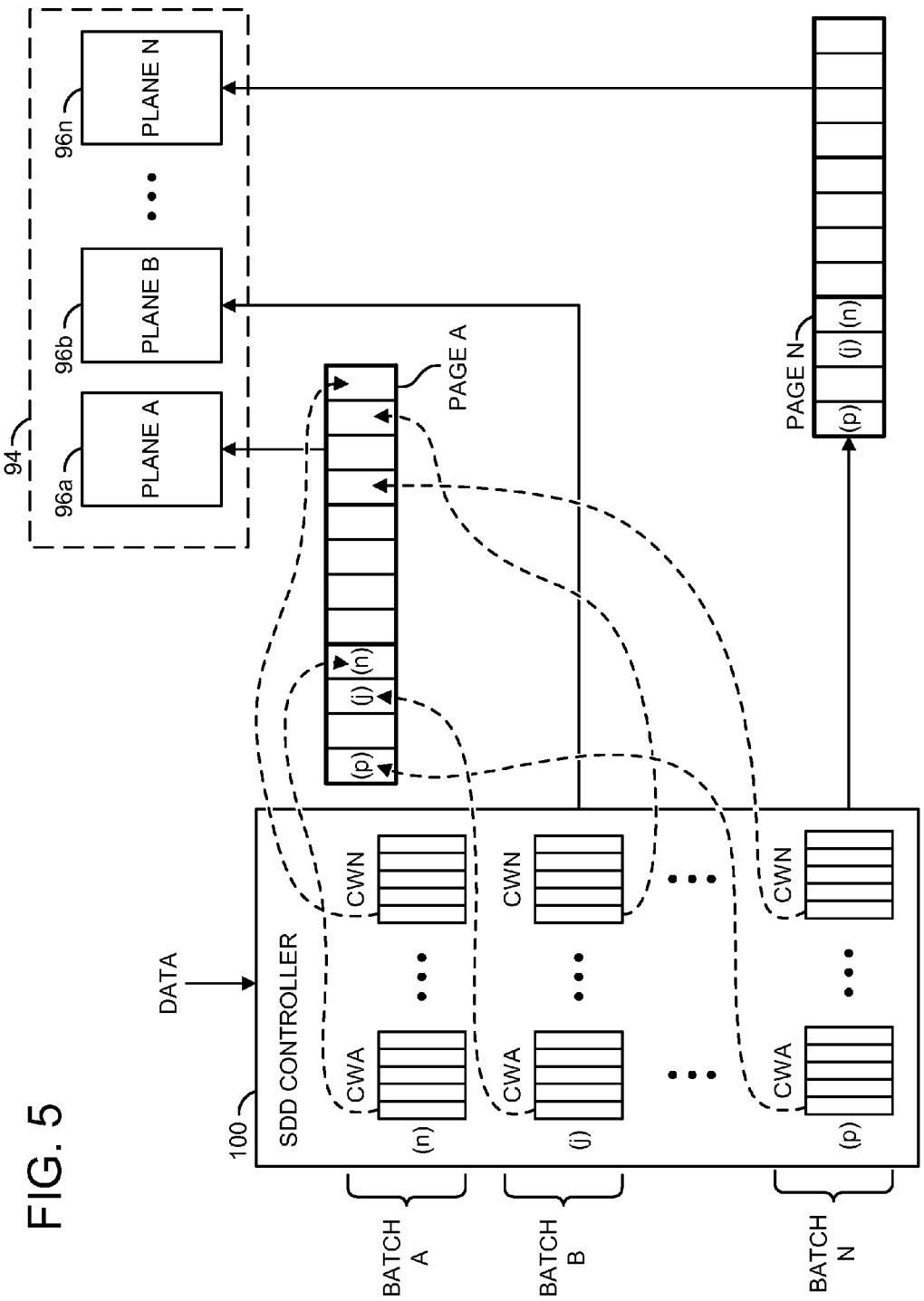
FIG. 5 is a diagram for mapping the slices into memory planes.

Referring to FIG. 5, a diagram of an example mapping of the slices 162a-162n of multiple codewords into the devices 96a-96n is shown. Returning to FIG. 3, the batches (e.g., batch A to batch N) created in the step 144 are gathered (or assembled) together by the circuit 100 in the form of a redundancy block having multiple pages (e.g., page A to page N).

The slicing in the step 146 divides the codewords (e.g., CWA to CWN) in each batch A-N (and thus divides the batches A-N) into smaller pieces.

In the step 148, the slices 162a-162n from different codewords CWA-CWN in each batch A-N and/or the slices 162a-162n from different batches A-N are interleaved into the pages A-N. In the example shown in FIG. 5, the page A contains multiple (e.g., two) slices from the batch A, multiple (e.g., two) slices from the batch B and multiple (e.g., two) slices from the batch N. In various embodiments, one or more of the batches A-N may become a page without interleaving the slices 162a-162n. As a result, the non-interleaved page is stored in a plane (e.g., plane B) of a device (e.g., circuit 96b).

In the step 150, the pages A-N containing the interleaved and/or non-interleaved slices 162a-162n are assembled into a redundancy block. The redundancy block is subsequently written into the circuit 94 in the step 152. As part of the write operation, each page A-N is stored in a respective plane among the planes A-N. In various embodiments, each of the respective planes A-N are stored in a different device 96a-96n. In some embodiments, two or more of the respective planes are in the same device 96a-96n (e.g., 2 or 4 planes in a die can be accessed in parallel).

Consider an example where each plane (e.g., physical page) has a size of m codewords and each codeword has n slices. A k-th slice of all codewords on the same column form a virtual codeword. At a slice per column, the m columns form up to m virtual codewords. The m virtual codewords are written to the k-th flash plane in the circuit 94. The interleave mapping causes no additional hardware costs and no read/write performance degradation. Using the mapping, each physical codeword is distributed to multiple flash planes and thus the worst-flash-plane problem is overcome.

Figure 6:
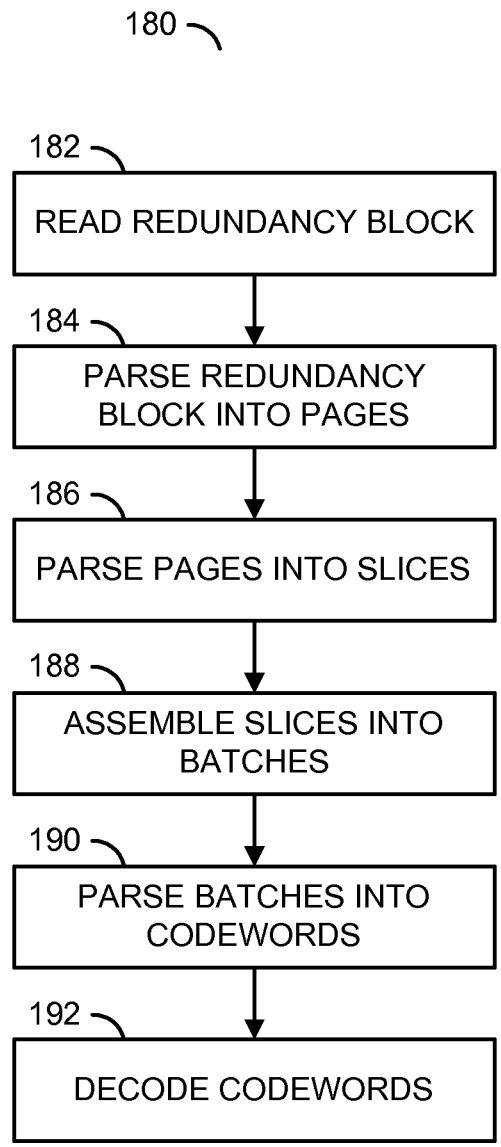
FIG. 6 is a flow diagram of a method for reading.

Referring to FIG. 6, a flow diagram of an example method 180 for reading is shown. The method (or process) 180 is implemented by the circuit 100. The method 180 generally comprises a step (or state) 182, a step (or state) 184, a step (or state) 186, a step (or state) 188, a step (or state) 190, and a step (or state) 192. The steps 182 to 192 may represent modules and/or blocks that may be implemented as hardware, software, a combination of hardware and software, or other implementations. The sequence of the steps 182 to 192 is shown as a representative example. Other step orders may be implemented to meet the criteria of a particular application.

Figure 7:
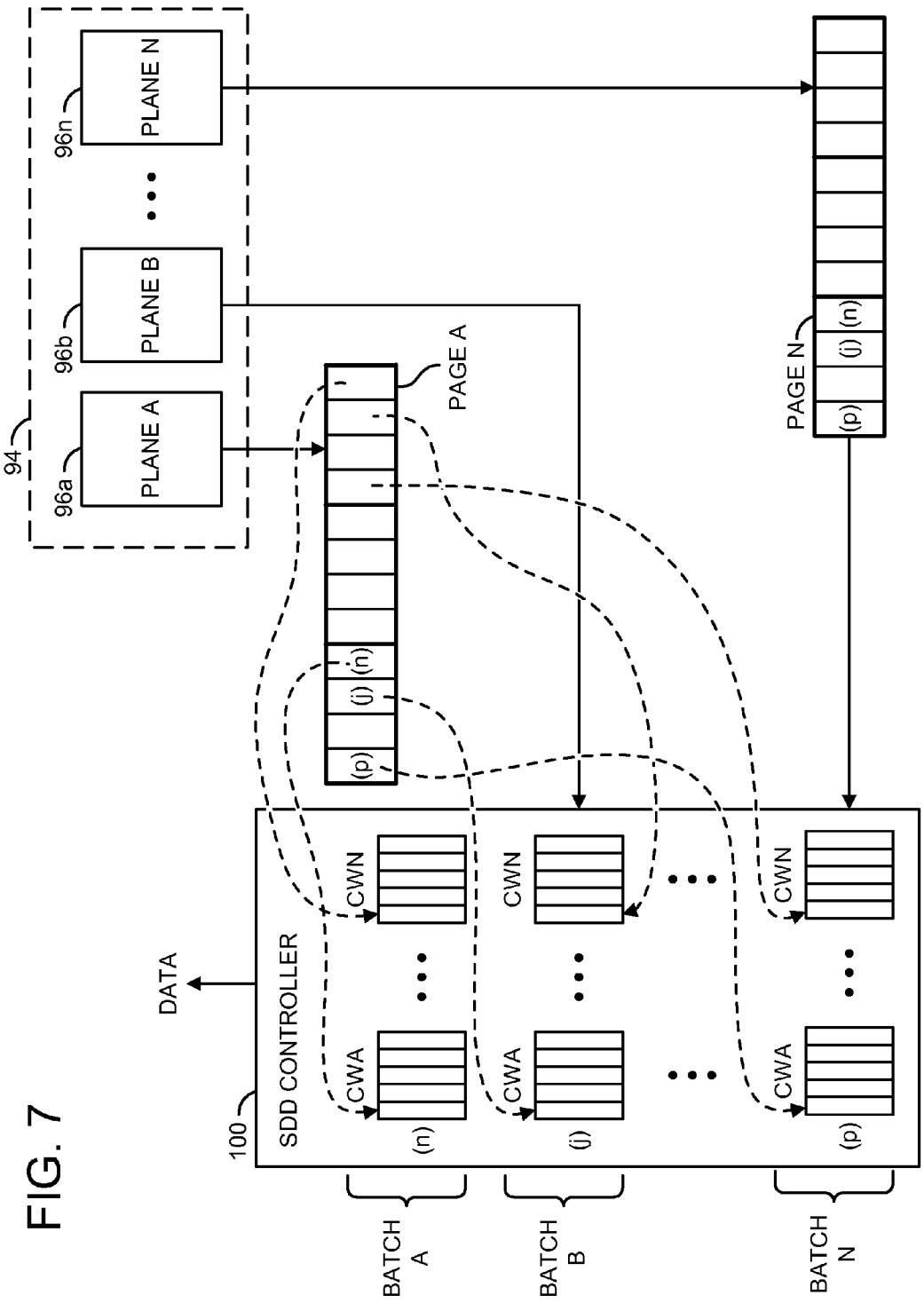
FIG. 7 is a diagram for mapping data from the memory planes into the multiple slices.

Referring to FIG. 7, a diagram of an example mapping of data in the devices 96a-96n into the multiple slices 162a-162n of multiple codewords CWA-CWN is shown. Returning to FIG. 6, a redundancy block is read from the circuit 94 in the step 182. The redundancy block that is read from a given address in the circuit 94 is the same as the redundancy block previously written to the given address, apart from errors. The redundancy block is parsed by the circuit 100 in the step 184 to regenerate the pages A-N. The read pages are the same as the write pages of the previously written redundancy block.

In various embodiments, the pages A-N are parsed by the circuit 100 in the step 186 to regenerate the slices 162a-162n. The slices 162a-162n are de-interleaved and assembled in the step 188 to regenerated the batches A-N. In some situations where the pages were not interleaved prior to writing, the de-interleaving step may be skipped. The batches A-N are parsed by the circuit 100 to regenerate the codewords CWA-CWN in the step 190. Each codeword CWA-CWN is decoded in the step 192 to recover the data units. The data units are presented in the signal DATA. The data units are subsequently transferred to the circuit 92 in the signal HOSTIO and/or to the source internal to the circuit 100 that initiated the read.

Following the write example involving the k-th column, reading the k-th flash plane returns a physical page that contains m virtual codewords to the circuit 100. Each virtual codeword has n slices. The i-th virtual codeword and j-th slice map to the i-th column and j-th row of a 2-dimensional read codeword buffer inside the circuit 100. Data units in the read codeword buffer can be transferred in the signal DATA to a host computer (via the signal HOSTIO) or other destination (e.g., internal to the circuit 100) that requested the read data.

The circuit 100 is generally useful for applications in which the dominant access patterns are sequential reads and/or accesses for a large data size. For example, accessing video files and audio file generally access large data sizes that are sensitive to the latency variation of different accesses. The circuit 100 is also useful for random read intensive applications and other random applications.

In some implementations, common hardware designs may be unaltered and the interleaving is enabled or disabled by software/firmware. For example, embodiments of the invention can be combined with current controller designs. Where the program/erase cycle count is low, the current designs are used to access the circuit 94. As the program/erase cycle count increases, the error rates in different die/planes generally increase. The program/erase cycle lifetime and maximum retention time of the different die/planes may also become different. For example, the codewords stored in the worst plane/die commonly fail to be corrected after many (e.g., 10,000) program/erase cycles. In a common design, a worst die is marked as unusable when that die fails. Thus, the program/erase cycle lifetime of the common flash-based solid-state drive with certain guaranteed capacity and without the interleaving is just 10,000 program/erase cycles. By enabling the interleaving, the errors in the codewords are the average of multiple die/planes. Thus, the codewords remain correctable even after 10,000 program/erase cycles. The solid-state drive remains usable for more that the 10,000 program/erase cycles without a loss in the capacity.

The interleaving can be implemented orthogonally to many other techniques, such as adaptive error correction coding over program/erase cycles. If the adaptive error correction coding is applied, the code rate is initially adapted over the program/erase cycles. As the program/erase cycles increase, the flash controller switches gradually to stronger error correction coding (e.g., lower coding rate error correction codes) until eventually the strongest error correction coding is applied (e.g., a lowest coding rate error correction code). As the program/erase cycles continue to increase, the lowest coding rate error correction code on the weakest flash block/die/plane eventually fails. By enabling the interleaving, the weakest die may be still remain usable, and thus the program/erase cycle lifetime is extended without a capacity loss.

Various implementations of the invention cause the performance of the circuit 102 to be more predicable compared with conventional techniques. The interleaving reduces the cases where more errors exist within some codewords than other codewords stored in different die/planes. Distributing each codeword across multiple physical flash planes avoids a bottleneck caused by the worst flash plane. The reliability and lifetime are thus improved.

The functions performed by the diagrams of FIGS. 1-7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a memory configured to store data; and
   a controller configured to process a plurality of input/output requests to read/write to/from the memory, generate a plurality of codewords by encoding a plurality of data units, assemble the plurality of codewords into a plurality of batches, generate a plurality of slices by parsing the plurality of batches, generate a plurality of data pages by interleaving the slices, and write the plurality of data pages in parallel into a plurality of planes in the memory, wherein each of the plurality of planes corresponds to one of the plurality of batches, each of the plurality of planes has a plurality of physical pages, and each of the plurality of data pages has a size that matches one of the plurality of physical pages.

2. The apparatus according to claim 1, wherein the memory includes a plurality of flash memories.

3. The apparatus according to claim 1, wherein one or more of the plurality of data pages contain the slices from two or more of the plurality of batches.

4. The apparatus according to claim 1, wherein the controller is further configured to regenerate the plurality of data pages by reading from the plurality of planes in the memory in parallel regenerate the plurality of slices by parsing the plurality of data pages, regenerate the plurality of codewords from the plurality of slices, and regenerate the plurality of data units by decoding the plurality of codewords.

5. The apparatus according to claim 4, wherein the controller is further configured to regenerate the plurality of batches from the plurality of slices.

6. The apparatus according to claim 5, wherein the plurality of codewords are regenerated by parsing the plurality of batches.

7. The apparatus according to claim 1, wherein each of the plurality of data pages is written in a different one of a plurality of die in the memory.

8. A method for interleaving data over a plurality of planes, comprising the steps of:
   processing a plurality of input/output requests to read/write to/from a memory;
   generating a plurality of codewords by encoding a plurality of data units;
   assembling the plurality of codewords into a plurality of batches;
   generating a plurality of slices by parsing the plurality of batches;
   generating a plurality of data pages by interleaving the plurality of slices; and
   writing the data pages in parallel into the plurality of planes in the memory, wherein each of the plurality of planes corresponds to one of the plurality of batches, each of the plurality of planes has a plurality of physical pages, and each of the plurality of data pages has a size that matches one of the plurality of physical pages.

9. The method according to claim 8, wherein the memory includes a plurality of flash memories.

10. The method according to claim 8, wherein one or more of the plurality of data pages contain the slices from two or more of plurality of batches.

11. The method according to claim 8, further comprising the steps of:
- regenerating the plurality of data pages by reading from the plurality of planes in the memory in parallel;
- regenerating the plurality of slices by parsing the plurality of data pages;
- regenerating the plurality of codewords from the plurality of slices; and
- regenerating the plurality of data units by decoding the plurality of codewords.

12. The method according to claim 11, further comprising the step of:
- regenerating the plurality of batches from the plurality of slices.

13. The method according to claim 12, wherein the plurality of codewords are regenerated by parsing the plurality of batches.

14. The method according to claim 8, wherein each of the plurality of pages is written in a different one of a plurality of die in the memory.

15. The method according to claim 8, further comprising the steps of:
- assembling the plurality of data pages into a redundancy block;
- generating parity information for the redundancy block; and
- writing the parity information into the memory.

16. The method according to claim 8, wherein the steps are performed in a solid-state drive.

17. An apparatus comprising:
- an interface configured to process a plurality of read/write operations to/from a memory; and
- a control circuit configured to generate a plurality of codewords by encoding a plurality of data units, assemble the plurality of codewords into a plurality of batches, generate a plurality of slices by parsing the plurality of batches, generate a plurality of data pages by interleaving the slices, and write the plurality of data pages in parallel into a plurality of planes in the memory, wherein each of the plurality of planes corresponds to one of the plurality of batches, each of the plurality of planes has a plurality of physical pages, and each of the plurality of data pages has a size that matches one of the plurality of physical pages.

18. The apparatus according to claim 17, wherein the interface and the control circuit form part of a solid-state drive controller.

19. The apparatus according to claim 1, wherein the controller is further configured to assemble the plurality of data pages into a redundancy block, generate parity information for the redundancy block, and write the parity information into the memory.

20. The apparatus according to claim 1, wherein the memory and the controller form part of a solid-state drive.

* * * * *